March 30, 1943. J. F. ANDREWS 2,315,383
METHOD AND APPARATUS FOR LOCATING TRANSMISSION FAULTS
Filed June 14, 1941

INVENTOR
J. F. ANDREWS
BY H. A. Burgers
ATTORNEY

Patented Mar. 30, 1943

2,315,383

UNITED STATES PATENT OFFICE 2,315,383

METHOD AND APPARATUS FOR LOCATING TRANSMISSION FAULTS

Joseph Frank Andrews, New York, N. Y., assignor to American Telephone and Telegraph Company, a corporation of New York Application June 14, 1941, Serial No. 398,173

12 Claims. (Cl. 175—183)

This invention relates to a method of and apparatus for measurement of time delay between two alternating current waves, and more particularly to such measurement of time delay for determining the location of faults on signaling transmission lines.

Heretofore, an arrangement involving measurement of phase shift of alternating current waves has been utilized to ascertain the location of faults on signaling transmission lines. This arrangement has been expeditiously utilized in the factory during the manufacture of individual lengths of transmission cable, and in the field on sections of transmission lines on an intermittent basis. Obviously, such arrangement is unsuited for either indicating or locating faults of a transient nature. Another technique for locating faults in long transmission lines has been to embody a fault indicator in each section thereof and then to assign a workman to each such indicator so that when a fault occurs on the line the occurrence of the latter may be promptly telephoned by the workman to a supervisory station. This enables identification of a particular section on which a fault occurred but without regard to the definite location of the transient on the particular section. This is unsatisfactory for the reasons that (1) the fault is not definitely located, and (2) it is too expensive from the standpoint of personnel required.

The present invention contemplates fault locating apparatus which both indicates the occurrence of faults of such nature that signaling transmission is interrupted and at the same time provides indications that may be expeditiously utilized to locate individual faults.

The main object of the invention is to locate individual faults on a transmission line.

Another object is to record the occurrence of a series of discrete faults on a transmission line.

A further object is to provide facile apparatus which automatically records the occurrence of a fault such that the location of the fault may be readily determined from the recording.

A still further object is to provide a record of successive discrete faults such that the location of each discrete fault may be expeditiously ascertained from the several records.

Still another object of the invention is to record at unattended points the occurrence of faults on a transmission line.

Another object is to record the occurrence of transient faults at unattended points of a transmission line such that the record may thereafter be utilized to determine the location of the individual transient faults.

In a specific embodiment, the invention comprises a transmission line to a near point of which are continuously applied two sources of alternating current waves of frequencies $f_1$ and $f_2$, and at a far point of which are connected two circuits, each of which is arranged to select an individual frequency $f_1$ or $f_2$, and embodies an electromagnetic relay. A suitable timing device connected to the two individual relays serves to record the time delay between interruptions of the waves $f_1$ and $f_2$ at the far point of the line.

When a condition of no faults obtains on the transmission line, the two waves $f_1$ and $f_2$ received continuously at the far point maintain the two relays in an operated condition thereby preventing operation of the timing device. However, when a fault occurs at an unknown point to interrupt transmission on the line, the two waves $f_1$ and $f_2$ are interrupted at the far point thereof on a time basis, depending on their individual rates of propagation. Assuming the wave $f_1$ to have the higher rate of propagation, then the one frequency selective circuit responsive to the wave $f_1$ causes the relay associated therewith to be the first relay returned to an unoperated condition, and the frequency selective circuit responsive to the wave $f_2$ will next cause the relay associated therewith to be returned to an unoperated condition. The time interval between such operations of the two relays is recorded in the timing device. This recording serves both to indicate the occurrence of a fault and to enable a location thereof with respect to the far point of the line.

The invention will be readily understood from the following description taken together with accompanying drawing in which.

Figure 1:
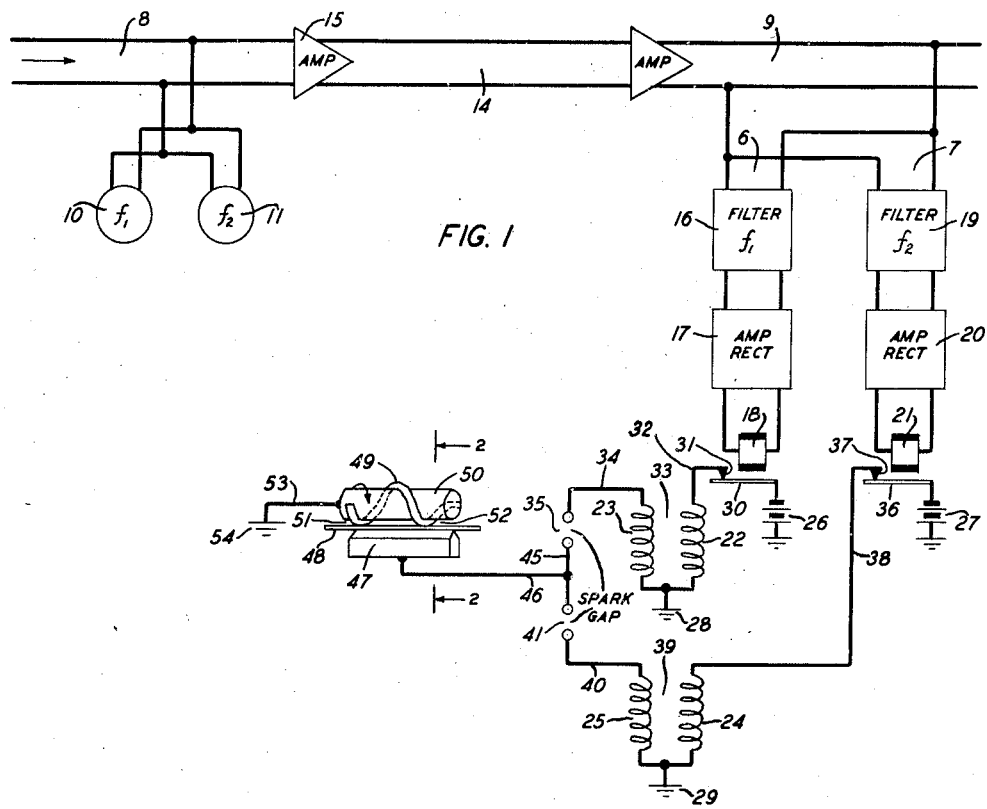
Figure 1 is a schematic circuit showing a specific embodiment of the invention.

Referring to Fig. 1, sources 10 and 11 of alternating current sine waves having frequencies $f_1$ and $f_2$ are continuously applied across a near point 8 of a line 14 transmitting signaling energy in the direction indicated by the arrow. This line may embody one or more amplifiers 15 of a suitable type.

Across a far point 9 of the line 14, are connected a first frequency selective circuit 6 embodying in sequence a filter 16, amplifier-rectifier 17 and electromagnet relay 18, and a second frequency selective circuit 7 having in sequence a filter 19, an amplifier-rectifier 20 and an electromagnetic relay 21. Armature 30 of the relay 18 has inner contact 31 connected by a lead 32, both windings of spark coil 33 and lead 34 to the upper terminal of spark-gap 35. Armature 36 of the relay 21 has inner contact 37 connected by lead 38, both windings of spark coil 39, lead 40 to a lower terminal of spark-gap 41.

Sources 26 and 27 of direct current voltage are connected to corresponding terminals of the respective armatures 31 and 37. The corresponding terminals of the two windings of both spark coils 33 and 39 are extended to respective grounds 28 and 29.

Figure 2:
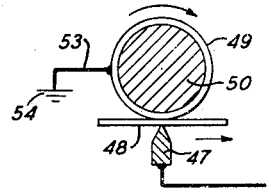
Fig. 2 is a view taken along the line 2—2 of Fig. 1.

A link 45 joining the adjacent terminals of both spark-gaps 35 and 41 is connected by lead 46 to a knife-edge bar 47 engaging the under surface of paper 48 whose upper surface contacts at spaced points 51 and 52 of a raised spiral portion 49, formed on the periphery of a rotating cylinder 50, as illustrated in both Figs. 1 and 2. The spiral portion 49 is applied over lead 53 to ground 54.

The paper 48 is colored, preferably pink, and covered on opposite surfaces with a thin coating of wax so that when the paper is perforated by a spark, in a manner that will be subsequently explained, such perforations will be readily recognizable. This type of paper is well known in the art.

In the operation of Figs. 1 and 2, the two individual waves having the frequencies $f_1$ and $f_2$ are simultaneously applied to near point 8 of the line 14. At a far point of this line, these two waves are individually selected, rectified and the individual rectified energy utilized to energize the windings of one of the relays 18 and 21. In the absence of a fault of such nature as to cause an interruption of transmission on the line 14, the two relays 18 and 21 are maintained in an operated condition. This means that current from the source 26 flows through ground 28 and winding 22 of the spark coil 33, lead 32, contact 31 and armature 30 of relay 18 back to the source 26; and that current from the source 27 flows through ground 29, and winding 24 of the spark coil 39, lead 38, contact 37 and armature 36 of the relay 21 back to the source 27.

Consequently, no action takes place with regard to the paper 48. Hence, this may be taken to indicate that a non-fault transmission condition obtains on the line 14 between the respective near and far points 8 and 9 thereof.

However, in the event of the occurrence of a fault of such nature as to momentarily interrupt transmission on the line 14 at an unknown point lying somewhere between the respective near and far points 8 and 9, the waves $f_1$ and $f_2$ will be interrupted at the receiving point 9 in a time order depending on their individual rates of propagation. Assuming for the purpose of this explanation that wave $f_1$ possesses the higher rate of propagation and therefore is the first wave to be terminated, then the winding of relay 18 will become deenergized whereupon the armature 30 moves to its outer contact.

This causes an abrupt termination of current flow in the winding 22 of the spark coil 33. Such termination of the current serves to induce a relatively sharp voltage pulse of brief duration in the winding 23 of the spark coil 33. This voltage is transmitted over a circuit including from ground 28, winding 23 of the spark coil 33, lead 34, spark-gap 35, link 45, lead 46, bar 47, paper 48, spiral 49 of the roller 50, lead 53 to ground 54.

As this voltage is applied across the spark gap 35 between the grounds 28 and 54 in the circuit previously described, the spark-gap 35 is caused to break down. At the same time, this voltage causes a breakdown through the paper 48 at a point on the spiral portion 49, say, for example, point 51 and a point on the knife-edge bar 47 diametrically opposite thereto. As these diametrically opposite points engage the paper 48 on relatively small diametrically opposite areas, a relatively small perforation is provided in the paper 48 at such areas of engagement thereon.

Then, the wave $f_2$ possessing the slower rate of propagation is terminated to cause a deenergization of the winding of the relay 21 whereupon the armature 36 falls back to its outer contact. This causes an abrupt termination of current flow in the winding 24 of the spark coil 39, which current termination serves to induce a relatively sharp voltage pulse of brief duration in the winding 25 of the spark coil 39. This voltage is transmitted over a circuit extending through ground 29, winding 25 of spark coil 39, lead 40, spark-gap 41, link 45, lead 46, knife-edge bar 47, paper 48, spiral 49 of the roller 50, lead 53 to ground 54.

As this voltage is effective across the spark-gap 41 between the grounds 29 and 54, as hereinbefore pointed out, the spark-gap 41 is caused to break down. Simultaneously therewith this voltage causes a breakdown through the paper 48 at another point on the spiral portion 49, say, for example, point 52 and a point on the knife-edge bar 47 diametrically opposite thereto. As these diametrically opposite points engage the paper 48 on relatively small diametrically opposite areas, a relatively small perforation is provided in the paper 48 at such areas of engagement.

Immediately subsequent to the production of the two perforations in the paper 48, a paper advancing instrumentality, not shown, is actuated to advance the paper 48 a predetermined distance in preparation for the next succeeding pair of perforations. This instrumentality may be of a suitable type of which many are well known.

As the perforating of the paper 48 is accompanied with a sufficient amount of heat to melt the wax coating of the latter in the vicinity of each of the perforations, the identification of the two perforations on the blue background of the paper 48 becomes a rather simple matter. The time interval between the production of the two perforations may be readily calculated by correlating the measured distance on the paper 48 between the two perforations and the speed of rotation of the roller 50. Such time interval also represents the delay between the waves $f_1$ and $f_2$ in traveling on the line 14 between the unknown point of the fault and the far point 9.

The delay between the waves $f_1$ and $f_2$ may be utilized to locate the distance back from the far point 9 to the unknown point at which the fault occurred, in the following manner:

It is known that the rate of propagation of alternating current waves over a transmission line involves their individual velocities, as well as other characteristics; and that the velocity of individual alternating current waves depends on the equalization of the transmission line for various frequencies. For the purpose of this description, the characteristic of most importance is velocity which will be presently discussed. Delay characteristics of two different lines found useful for an application of this invention are illustrated in Fig. 3.

Figure 3:
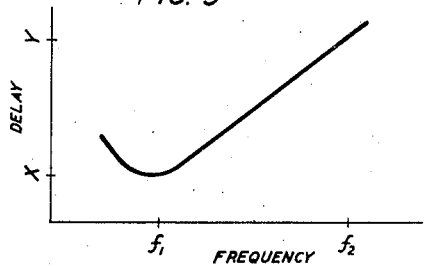
Fig. 3 is a curve representing the delay characteristic of waves of different frequencies on a transmission line.

Referring to Fig. 3, it is seen that the wave $f_1$ has a higher rate of propagation than the wave $f_2$. Thus, if waves $f_1$ and $f_2$ were applied at the same instant to a near point of a line, having length L, the time difference between the arrivals of these two waves at a far point is $$y - x = t \quad (1)$$

where $x$ is the time of arrival of wave $f_1$, $y$ is the time of arrival of wave $f_2$, and $t$ is the time difference therebetween.

Now, if the waves $f_1$ and $f_2$ were interrupted at an unknown point lying between the near and far points of the line L, the wave $f_1$ having the higher rate of propagation would still be the first of these two waves to arrive at the far point of the line L, and of course the wave $f_2$ will be the second wave to arrive at the same far point. Thus, the time difference between such arrival of the waves $f_1$ and $f_2$ is $$y' - x' = t' \quad (2)$$

where $x'$ is the time of arrival of wave $f_1$, $y'$ is the time of arrival of wave $f_2$, and $t'$ is the time difference therebetween.

In this connection, the length of transmission line traveled by the waves $f_1$ and $f_2$ after the fault interruption may be represented as $L'$, which length is obviously the same as the distance back from the far point to the unknown point of the fault.

Thus, from Equation 1

$$L \text{ is proportional to } t \quad (3)$$

where L is the over-all length of the transmission line, and from Equation 2

$$L' \text{ is proportional to } t' \quad (4)$$

where $L'$ is the length of transmission traversed by $f_1$ and $f_2$ after the fault interruption.

Relating Equations 3 and 4

$$\frac{L}{L'} = \frac{t}{t'} \quad (5)$$

or $$L' = \frac{Lt'}{t} \quad (6)$$

where $L'$ is the distance on the line back from the far point to unknown point of the fault, L is the over-all length of the line, $t'$ is the time difference between the travel time of waves $f_1$ and $f_2$ from the unknown point of the fault to the far point of the line, and $t$ is the time difference between the travel time of the waves $f_1$ and $f_2$ at the far point of the line, assuming a condition of no fault on the line and the simultaneous application of both waves $f_1$ and $f_2$ to the near point thereof.

Thus, the location of the unknown point of the above assumed fault on the line 14 may be ascertained from Equation 6 by substituting therein; for $t'$, the time difference between the arrival of the waves $f_1$ and $f_2$ at the far point 9 after the fault interruption; for L, the over-all length of the line 14; and for $t$, the time difference between the arrival of the waves $f_1$ and $f_2$ at the far point 9 as both waves are simultaneously applied to the near point 8. Obviously, the distance $L'$ serves to locate on the line 14 the unknown point at which the assumed unknown fault occurred.

In connection with the spark-gaps 35 and 41 and the spark-gap of the paper 48, it is to be understood that the sum of lengths of both spark-gaps 35 and 41 is greater than the sum of either of the latter and the length of the spark-gap through the paper 48. Hence, the spark-gaps 35 and 41 are broken down in sequence for the successive individual voltage pulses effected by the spark coils 33 and 39 in the manner hereinbefore described. In other words, the two spark-gaps 35 and 41 are never simultaneously broken down.

What is claimed is:

1. The method of measuring time delay for locating faults on a long transmission line, comprising continuously transmitting two waves of different frequencies over said line to observe the time delay between interruptions of the individual waves at a certain point on said line due to the occurrence of the fault at an unknown point on said line, and utilizing said time delay to determine the distance on said line extending from said certain point to said unknown point.

2. The method of measuring time difference for locating faults on a long transmission line, comprising continuously transmitting two waves of different frequencies over said line to observe at a certain point on said line the time difference between interruptions of individual waves caused by the occurrence of the fault at a different point on said line, and utilizing said time difference to determine the distance on said line extending from said certain point to said different point such that said distance is proportional to said time difference.

3. The method of measuring time difference for locating faults on a long transmission line, comprising continuously and simultaneously transmitting two alternating current waves of different frequencies over said line, continuously and simultaneously translating individual waves into individual unidirectional currents at a certain point on said line, utilizing the individual unidirectional currents to record interruptions of individual waves in response to the fault occurring at an unknown point on said line, and utilizing the time difference between the individual wave interruptions to determine the distance on said line extending from said certain point to said unknown point such that said distance is proportional to said time difference.

4. The method of locating faults on a transmission line, comprising transmitting continuously a pair of alternating current waves of different frequencies between two spaced points on said line, observing the individual interruptions of said two waves at one of said two points after a fault has interrupted transmission on said line at an unknown point intermediate said two points, and utilizing said observed individual wave interruptions to ascertain the time difference therebetween to determine the distance from said one point to said unknown intermediate point such that said distance is proportional to said time difference.

5. The method of locating faults on a transmission line, comprising transmitting continuously a pair of alternating current waves of different frequencies between two points on said line, receiving continuously said two waves on an individual basis at one of said two points, observing the time difference between the individual interruptions of said two waves at said one point after a fault has interrupted transmission on said line at an unknown point intermediate said two points, and utilizing said time difference to determine the distance intervening between said one point and said unknown intermediate point such that said distance is proportional to said time difference.

6. In combination, in apparatus for locating transmission faults, a line subject to a fault causing an interruption of transmission, means to apply two alternating current waves having different frequencies continuously to one point on said line, and means at another point on said line to selectively receive said two waves continuously such that interruptions of individual waves, due to the occurrence of the fault at a point intermediate said one and other points, are recorded on a time basis.

7. In combination, in apparatus for locating transmission faults, a line subject to a fault causing an interruption of transmission, means to apply continuously to one end of said line two alternating current waves having different frequencies, and means at an opposite end of said line to observe the time difference between interruptions of individual waves after the fault has occurred at a point intermediate said one and opposite ends for locating said intermediate point with respect to said opposite end, the distance intervening between said intermediate point and said opposite end being proportional to said time difference.

8. In combination, in apparatus to measure time difference for locating faults on a long transmission line, means to apply two waves of different frequencies continuously to one point on said line, means to receive said two waves continuously on an individual basis at another point on said line, individual means controlled by the individual waves, and means responsive to said individual means to observe interruptions of individual waves caused by the fault occurring on said line at an unknown point intermediate said one and other points whereby the difference between the travel time of said two waves between said unknown point and said other point is ascertained, the distance on said line extending between said unknown point and said other point being proportional to said time difference.

9. A system to ascertain time difference for locating faults on a long transmission line, comprising means to apply two waves of different frequencies continuously to one terminal of said line, means to selectively receive said two waves continuously at another terminal of said line, means controlled by said receiving means for observing interruptions of individual waves, due to the occurrence of the fault at a point intermediate said one and other terminals, to ascertain the difference between the travel time of said two waves from said intermediate point to said other terminal, the distance on said line extending from said intermediate point to said other terminal being represented by L' in equation $$L' = \frac{Lt'}{t}$$

where L is the over-all length of said line, $t'$ is the difference between the travel time of said two waves from said intermediate point to said other terminal, and $t$ is the difference between the travel time of said two waves from said one terminal to said other terminal.

10. A system to ascertain time delay for locating faults on a long transmission line, comprising means to apply two waves of different frequencies continuously to one terminal of said line, means to selectively receive said two waves continuously at another terminal of said line, and means responsive to said receiving means to record interruptions of individual waves, due to the occurrence of the fault at a point intermediate said one and other terminals, to ascertain the delay between the travel time of said two waves from said intermediate point to said other terminal for locating said intermediate point, the distance on said line extending from said intermediate point to said other terminal being proportional to said time delay.

11. A system to ascertain time difference for locating faults on a long transmission line, comprising means to apply two alternating current waves of different frequencies continuously to one terminal of said line, means to receive said two waves continuously on an individual basis at another terminal of said line, means to continuously amplify and rectify individual waves, means controlled by said individual amplifying and rectifying means, and means responsive to said controlled means to effectively record interruptions of individual waves in response to the fault occurring at a point intermediate said one and other terminals, to ascertain the difference between the travel time of said two waves from said intermediate point to said other terminal for locating said intermediate point, the distance on said line extending from said intermediate point to said other terminal being proportional to said travel time difference between said two waves.

12. In combination, in apparatus to measure time difference on a long transmission line, means to apply continuously two waves of different frequencies to one terminal of said line, means to receive said two waves on an individual basis continuously at another terminal of said line, means to amplify and rectify individual waves, means controlled by said individual amplifying and rectifying means, and means responsive to said controlled means such that a non-operated condition indicates normal transmission on said line with respect to the occurrence of the fault and such that an operated condition records the interruptions of individual waves on a time basis to indicate both the occurrence of the fault at a point intermediate said one and other terminals and the difference between the travel time of said two waves from said intermediate point to said other terminal.

JOSEPH F. ANDREWS.